United States Patent [19]

Due et al.

[11] Patent Number: 5,809,690
[45] Date of Patent: Sep. 22, 1998

[54] TUBULAR PLANT GUARD WITH RELEASABLE FASTENER STRIP

[75] Inventors: Graham Richard Due; Leigh Gryst, both of Beverley, Australia

[73] Assignee: Gro-Guard Australia Pty Ltd, Beverley, Australia

[21] Appl. No.: 765,775

[22] PCT Filed: Jul. 13, 1995

[86] PCT No.: PCT/AU95/00425

§ 371 Date: Jan. 14, 1997

§ 102(e) Date: Jan. 14, 1997

[87] PCT Pub. No.: WO96/02125

PCT Pub. Date: Feb. 1, 1996

[30] Foreign Application Priority Data

Jul. 14, 1994 [AU] Australia .................. PM 6814

[51] Int. Cl.⁶ .................................................. A01G 13/02
[52] U.S. Cl. .................................................. 47/30; 47/26
[58] Field of Search ........................... 47/21, 26, 30

[56] References Cited

U.S. PATENT DOCUMENTS

| | | | |
|---|---|---|---|
| 327,510 | 10/1885 | Anderson | 47/26 X |
| D. 347,170 | 5/1994 | Due et al. | D9/430 |
| D. 353,767 | 12/1994 | Due et al. | D9/430 |
| 645,518 | 3/1900 | Watt | 47/30 |
| 4,969,555 | 11/1990 | Fitzgerald | 206/423 |
| 5,347,750 | 9/1994 | Mills | 47/30 |
| 5,471,783 | 12/1995 | McLean | 47/30 |
| 5,509,229 | 4/1996 | Thomasson et al. | 47/21 |

FOREIGN PATENT DOCUMENTS

| | | | |
|---|---|---|---|
| 325490 | 7/1989 | European Pat. Off. | 47/30 |
| 2680076 | 2/1993 | France | 47/30 |
| 1242580 | 8/1971 | United Kingdom . | |
| 2272622 | 5/1994 | United Kingdom . | |
| 19096 | 11/1992 | WIPO . | |
| 20684 | 10/1993 | WIPO . | |
| 15676 | 6/1995 | WIPO . | |

*Primary Examiner*—John A. Ricci
*Attorney, Agent, or Firm*—Flehr Hohbach Test Albritton & Herbert LLP

[57] ABSTRACT

A plant guard is formed from a panel of plastics material which is folded into a tubular shape with the adjacent vertical margins of the panel being connected together by a reclosable zip-type fastener which comprises fastener strips. Each strip has a locking profile portion which is adapted to releasably interlock with the locking profile portion of the other strip. The fastener strips are secured to opposite edge portions of the panel by heat welding or by an adhesive.

24 Claims, 4 Drawing Sheets

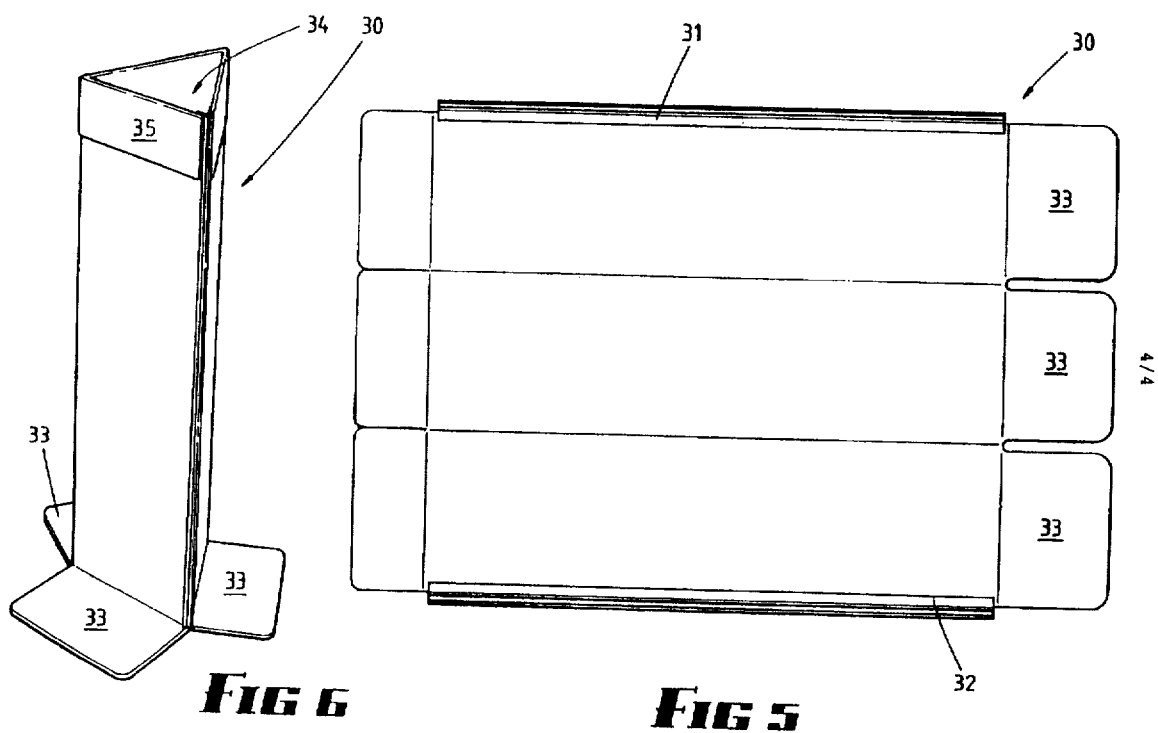

5,809,690

1

TUBULAR PLANT GUARD WITH RELEASABLE FASTENER STRIP

This invention relates to an improved plant guard useful for the protection of small plants, especially newly planted small vines, during the early stages of their growth.

It is known in the vine growing industry to use an elongate hollow guard which can be placed around a vine at the time of its planting in order to protect it during its early growth period. One such guard is described and illustrated in Australian Patent Specification No 23516/92 in the name of Ian McLean and which comprises a panel of flexible material adapted to be formed into a tubular body and releasably fastened in a tubular condition by means of co-operating tabs and tab engaging slots provided along the vertical edges of the panel which are to be joined together. This allows the guard to be supplied as a blank in a flat unfolded condition and subsequently formed into a tubular shape on site by a folding operation and interlocking the tabs and slots.

It is considered that the design and production of the guard disclosed in the aforesaid prior art reference can be considerably improved from the point of view of ease of manufacture and installation procedure. In particular, it has been found that the jointing together of the vertical margins of the guard panel using co-operating tabs and slots is generally unsatisfactory in that the tabs, in some circumstances, may disengage from their slots and also that gaps are created along the jointed ends of the guard panel which provide entry points for chemical spray, eg herbicides, which can have a deleterious effect on the young plant.

It is the main object of the present invention to provide a plant guard having improved fastening means for releasably interlocking adjacent edges of the guard panel when the panel is folded into its tubular shape on site.

It is another object of the present invention to provide a plant guard having an improved fastener device which is of simple construction and which allows the guard to be releasably locked in its tubular shape quickly and simply.

It is a further object of the present invention to provide a plant guard having improved fastening means which is designed, when fastened, to provide an approximate seal between the jointed vertical edges of the guard.

Broadly according to this invention therefore, an improved plant guard for protecting a small plant or sapling during its early growth period comprises a sheet like panel of flexible material which is adapted to be folded into a tubular shape, said panel having a pair of opposite edges which, when the panel is in its tubular shape, form adjacent vertical margins, and releasable fastening means for releasably fastening together said vertical margins, said releasable fastening means comprising interlockable resilient flexible fastener strips respectively secured to and extending along said vertical margins, said fastener strips having locking profile ribs which interlock with one another so as to provide a recloseable essentially zip type fastener.

The fastener strips can be formed separately to the panel or may be extruded integrally therewith.

Preferably, each said strip has a pair of flexible spaced apart locking ribs extending continuously along the length thereof, said ribs each being approximately arrow shaped with a central tip and barbs extending laterally to each side of the tip.

In a preferred embodiment of the invention, each said fastener strip has a first strip portion secured, eg by heat welding, adhesive or stitching, in face to face relation to the

2 inner surface of a marginal edge portion of the panel and a second strip portion which projects outwardly from the panel edge and which carries said locking ribs.

Preferably said fastener strips are formed of extruded plastics material and are of identical configuration.

Preferably the panel is formed from plastics flute material which consists of a pair of outer facing layers interconnected by a plurality of spaced apart short length webs so as to form a series of elongate internal channels extending along the length of the panel.

Preferably each of the fastener strips is secured by heat welding to an inner surface portion of the guard (when formed in its tubular shape).

In some instances, the base of the guard panel can be provided with outwardly projecting flap portions each of which is hingedly joined to the lower end of the guard along a hinge line, the flap portions, in use, providing a support base which can be buried in the ground.

With the guard of this invention, it has been found that by incorporating a zip type fastener for jointing together the vertical margins of the panel when folded into its tubular shape, an effective seal is provided along the length of the joint which prevents ingress of any chemical spray which might be sprayed around the plants at various stages during their initial growth, and helps to retain any water vapour and carbon dioxide which might be present, within the confines of the guard (which of course are important to the growth of the plant).

It has also been found that the recloseable zip type fastener is far more reliable in operation in that it is far less likely to come apart in the field.

It is a further advantage of the present invention that the plant guard can be packaged and transported to the consumer in a flat unformed condition and subsequently formed into its tubular shape by a simple folding operation and retained in that shape by press fitting the fastener strips together in a very simple operation.

BRIEF DESCRIPTION OF THE DRAWINGS

In order to further explain the present invention, several preferred embodiments thereof are described hereunder with reference to the accompanying drawings wherein:

FIGS. 5 and 6 are plan and perspective views respectively of a plant guard produced in accordance with a second embodiment of the invention; while

DETAILED DESCRIPTION OF THE INVENTION

Figure 1:
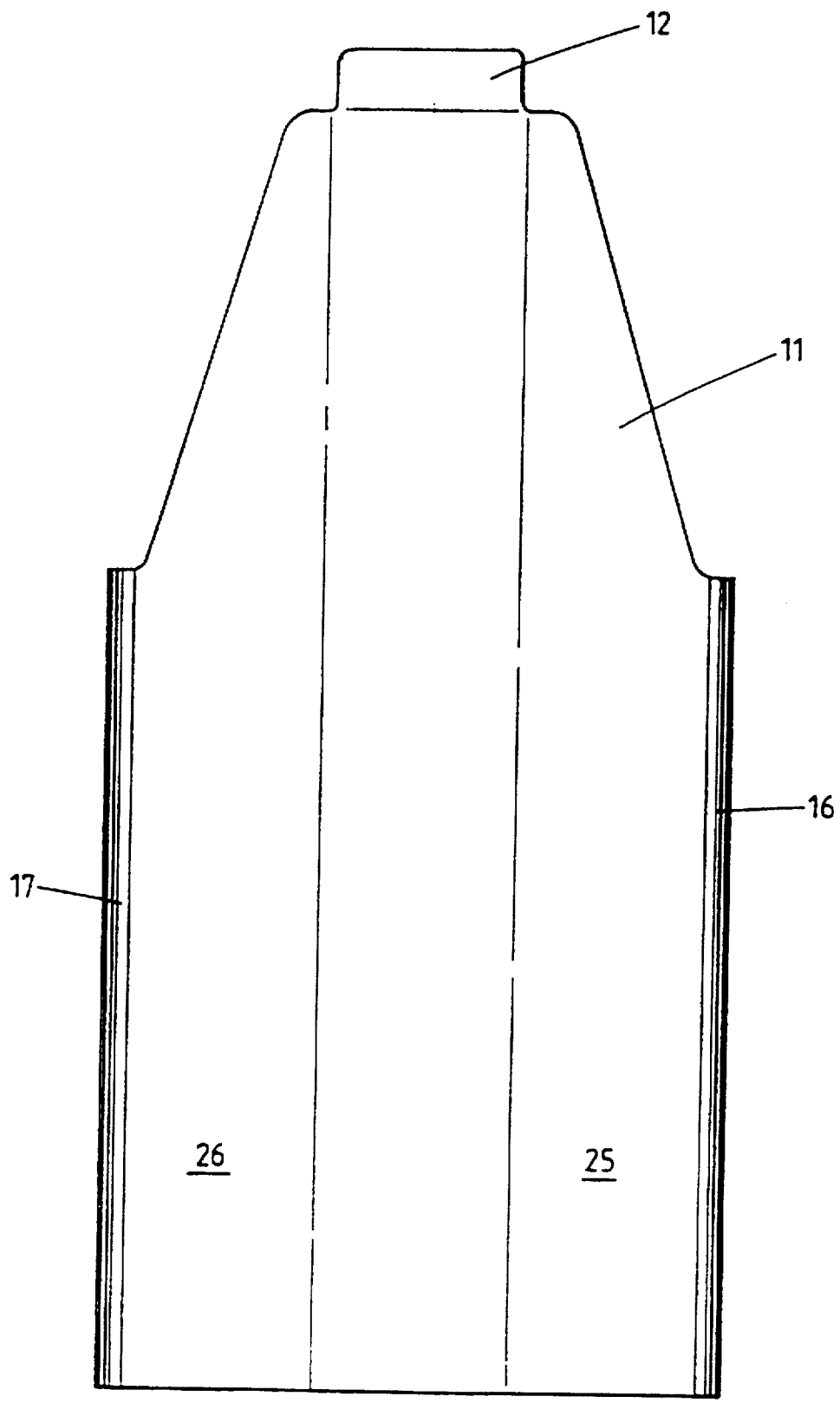
FIG. 1 is a plan view of a plant guard in its flat unassembled condition according to a first embodiment of the invention.
Figures 2, 3:
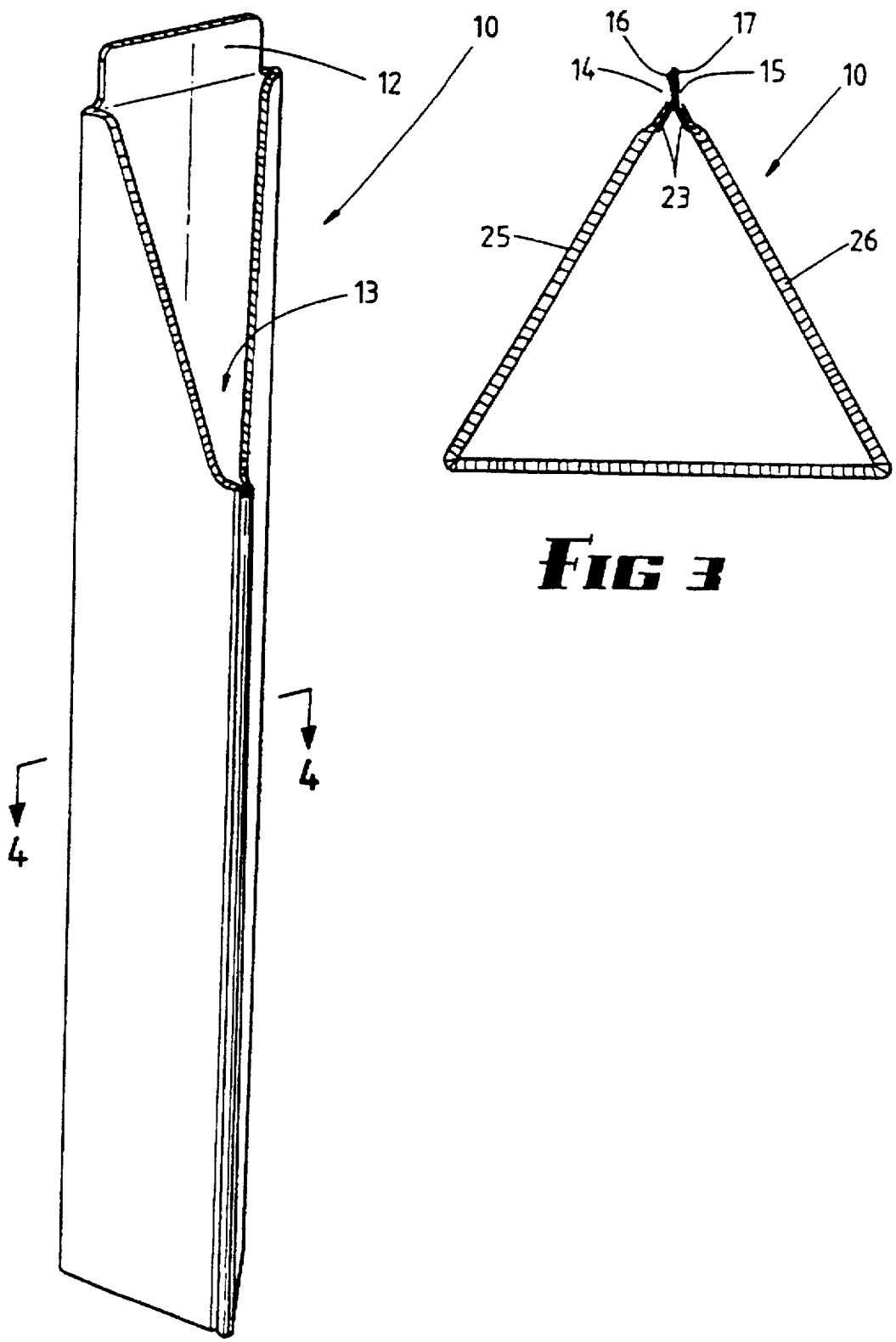
FIG. 2 is a perspective view of the guard shown in FIG. 1 in its folded condition.
FIG. 3 is an end view of the guard shown in FIG. 2.

Referring to FIGS. 1 to 4 of the drawings, there is shown a plant guard 10 produced from a blank 11 of plastic flute board in which is formed a pair of lengthwise fold lines which allow the blank 11 to be folded into the tubular triangular shape shown in FIG. 2. The general shape and configuration of the blank 11 is known in the art. The flap 12 provided along the upper edge of the guard 10 is designed to fold over and locate around a trellis wire to support the guard in an upright condition, while the cut-away section 13 which tapers downwardly from the upper end of the guard 10 is designed to allow vine shoots or runners from the vine plant (around which the guard 10 is placed) to pass laterally outwards from the interior of the guard as the vine plant grows upwardly through the guard—rather than having all of the shoots or runners emerging from the open top end of the guard.

Elongate extruded plastics fastener strips 16, 17 are secured to and extend along the pair of opposite vertical margins 14, 15 of the blank 11. Each fastener strip 16, 17 has a locking profile portion 18 comprising a pair of spaced apart locking profile ribs 19 extending continuously along the length of the strip 16, 17 and defining therebetween a continuous locking groove, the locking portions 18 of the strips 16, 17 being adapted to releasably interlock by engagement of one of the ribs 19 of one locking portion 18 into the locking groove of the locking portion 18 of the other strip. The ribs 19 are individually resilient flexible, each being arrow shaped with a central tip 21 and barbs 22 projecting laterally from each side of the tip so that in the interlocked condition of the fastener strips 16, 17, adjacent ribs 19 interlock with one another by virtue of the interlocking engagement of their barbs 22.

In this embodiment each of the fastener strips 16, 17 has a first portion 23 which is secured, eg by heat welding, to an inner surface portion of walls 25, 26 of the guard 10 adjacent the vertical edges 14, 15, and a second outboard portion 28 which carries the locking profile portion 18. When fastened together, the flexible strips 16, 17 will assume a bent configuration, with the outboard portion 28 being angled, eg at an angle of 30°, to the plane of the first strip portion 23.

Figures 4, 7:
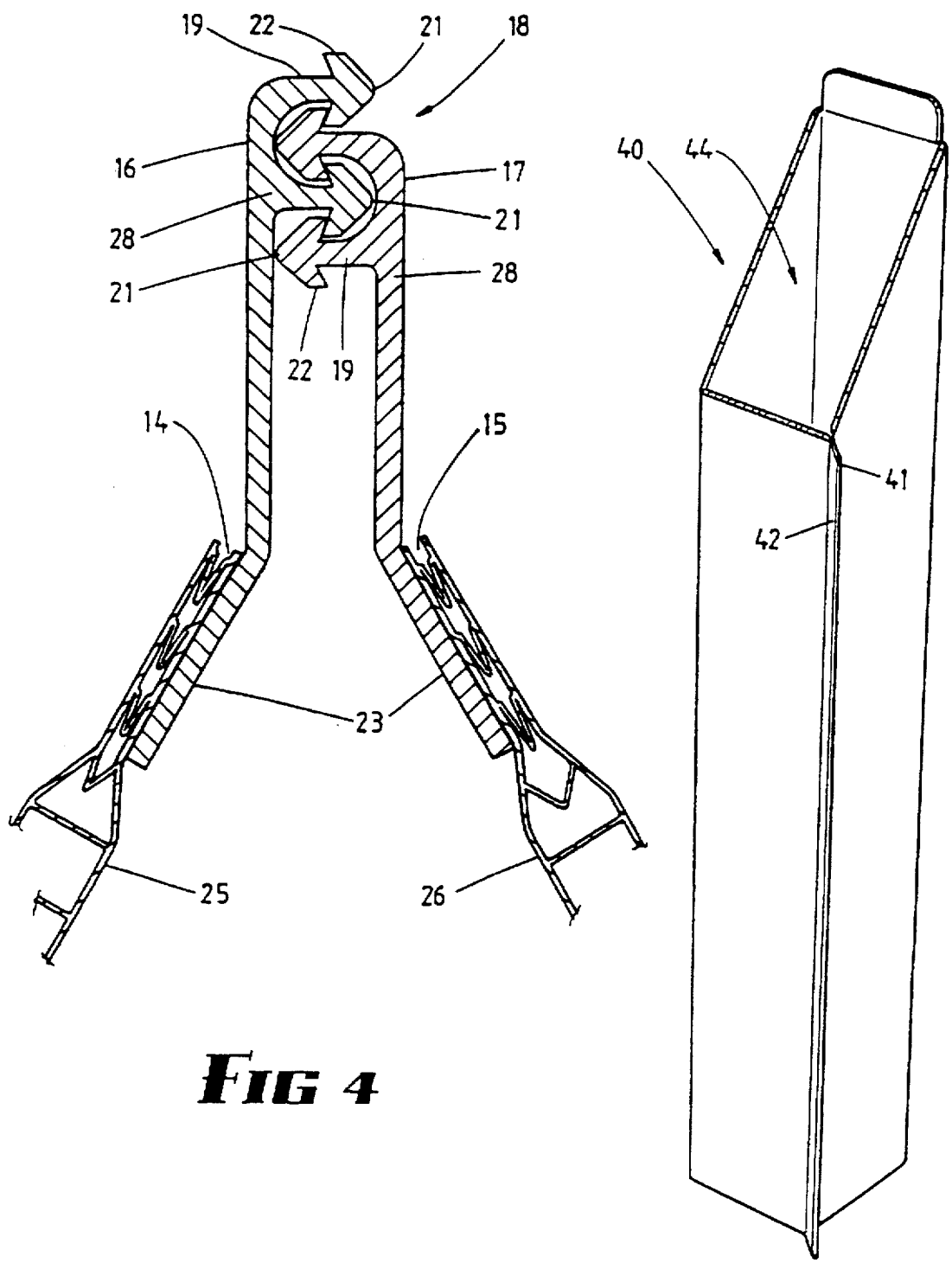
FIG. 4 is an enlarged transverse cross-sectional view showing the interlocking of the two fastener strips.
FIG. 7 is a perspective view of a plant guard produced in accordance with a third embodiment and which has a square configuration when folded.

As shown in FIG. 4, the second strip portions 28 project outwardly beyond the adjacent vertical margins 14, 15 of the guard 10 in approximately parallel relationship. This allows the locking ribs to be conveniently interlocked with a reduced tendency for the locking portions 18 to come apart during use of the guard.

It should be appreciated that the fastener strips 16, 17 may be secured to outer surfaces of the walls 25, 26 of the guard 10 rather than the inner surfaces thereof, and also that each of the strips 16, 17 can be formed essentially flat but with the locking ribs inclined with respect to the plane of the strip. It is desirable that the fastener strips are secured to the guard and configured in such a manner that when interlocked, the strips are not undesirably tensioned which might otherwise tend to prise them apart.

In this embodiment, the fastener strips are extruded of plastics material and can be formed as a one-piece extrusion which can be split longitudinally in half so as to form two separate fastening strips.

It should also be appreciated that the plastic fastener strips 16, 17 may be attached to vertical margins of the blank 11 by means other than heat welding, eg stitching or adhesive.

The fastener strips 16, 17 co-operate together to form a zip fastener device which provides an effective seal along the jointed edges of the guard 10. As mentioned previously, this provides an effective barrier (at near ground level) against the entry into the interior of the guard of chemical sprays, eg herbicides, which might have a deleterious effect on the growth of the plant. It also provides the advantage in that any water vapour and/or carbon dioxide which might be present, is likely to be retained within the confines of the guard.

Referring to FIGS. 5 and 6 of the drawings, the guard 30 illustrated therein is substantially similar to that of the first embodiment in that it is formed from a blank of flute board of plastics material and provided with a pair of elongate flexible fastener strips 31, 32 along opposite vertical edges thereof which are shaped and sized so as to interlock when press fitted together in order to retain the guard in a polygonal shape. In this embodiment however, the base of the guard 30 is provided with a plurality of outwardly projecting flaps 33 which are hingedly joined to respective walls of the guard 30 along hinge lines provided at the bottom of the guard. The flaps 33 form a stable support base which can be buried a small distance beneath the surface of the ground to thereby render the guard self-supporting. The guard 30, in this embodiment, has an open upper end 34 which is bordered by turned down flaps 35 which are joined by fold lines to respective wall panels of the guard 30.

The interlocking profiles of the locking portions of the fastener strips 31, 32 are identical to those described and illustrated in the first embodiment.

Referring to the embodiment shown in FIG. 7 of the drawings, the plant guard 40 is once again formed from a blank of flute board of plastics material and comprises fastener strips 41, 42 extending along its free vertical margins. In this instance, the guard is folded into the shape of a square, rather than triangular, as with the previous embodiments. The upper end of the guard 40 contains a cut-away portion 44 to allow the emergence of vine runners at a location intermediate the ends of the guard. The locking strips 41, 42 are essentially in accord with those shown in FIG. 4.

In the assembly of the guards, a hand tool can be used to facilitate the zip fastening of the locking strips, the tool being arranged to engage and slide downwardly along the projecting portions of the strips and simultaneously zip same together.

A brief consideration of the above described embodiments will indicate that the present invention provides a plant guard for protecting small plants which has a very simple and effective zip type fastener device for releasably retaining the guard in a tubular shape around the plant and which significantly facilitates the assembly of the guard in situ. The zipper type fastener also allows the guard to be readily opened and easily removed from its position around the plant.

The claims defining the invention are as follows, we claim:

1. A plant guard for protecting a small plant or sapling during its early growth period comprising:
    a sheet-like panel of flexible material which is adapted to be folded into a tubular shape with opposed edge margins of said panel being adjacent and extending outwardly in the same direction, and
    releasable fastening means for releasably fastening together said adjacent edge margins of said panel, said fastening means comprising opposed, interlockable fastener strips respectively extending along said edge margins, said fastener strips having identical locking profile ribs facing each other which interlock with one another to provide a reclosable fastener.

2. A plant guard according to claim 1 wherein each said strip has a pair of flexible spaced-apart locking ribs extending continuously along the length thereof, said ribs each being approximately arrow-shaped with a central tip and barbs extending laterally to each side of the tip, the barbs of said ribs being in interlocking engagement when said fastener strips are interlocked.

3. A plant guard according to claim 2 wherein each said fastener strip has a first strip portion secured to an inner surface portion of said panel adjacent a respective said edge margin, and a second strip portion integral with said first strip portion which projects outwardly from said edge margin, said locking ribs being located on said second strip portion.

4. A plant guard according to claim 1 wherein each said fastener strip has a first strip portion secured to an inner surface portion of said panel adjacent a respective said edge margin, and a second strip portion integral with said first strip portion which projects outwardly from said edge margin, said locking ribs being located on said second strip portion.

5. A plant guard according to claim 1 wherein said fastener strips are formed of extruded plastics material and are of identical configuration.

6. A plant guard according to claim 5 wherein the panel and said fastener strips are extruded integrally with one another.

7. A plant guard according to claim 1 wherein said panel is provided with outwardly projecting flap portions at the base thereof, each said flap portion being hingedly joined to said panel along a hinge line, said flap portions being arranged to provide a support base.

8. A plant guard according to claim 1 wherein said panel, when folded, is triangularly, square or rectangularly shaped.

9. A plant guard according to claim 1 where each said fastener strip is secured to the panel by heat welding, stitching or adhesive means.

10. A plant guard according to claim 1 wherein the edge margins of the panel have portions which converge towards the upper end of the panel.

11. A plant guard according to claim 1 further comprising a hinged flap hingedly joined to the upper edge of the panel along a hinge line, said flap, in use, being arranged to fold over and locate around a trellis wire whereby to support the guard in an upright condition.

12. A plant guard for protecting a small plant or sapling during its early growth period comprising:

a sheet-like panel of flexible material which is adapted to be folded into a tubular shape, and releasable fastening means for releasably fastening together adjacent edge margins of said panel and comprising interlockable resilient flexible fastener strips respectively secured to and extending along said edge margins, said fastener strips having locking profile ribs which interlock with one another so as to provide a reclosable fastener, each said strip having a pair of flexible spaced-apart locking ribs extending continuously along the length thereof, said ribs each being approximately arrow-shaped with a central tip and barbs extending laterally to each side of the tip, the barbs of said ribs being in interlocking engagement when said fastener strips are interlocked.

13. A plant guard according to claim 12 wherein each said fastener strip has a first strip portion secured to an inner surface portion of said panel adjacent a respective said vertical margin, and a second strip portion integral with said first strip portion which projects outwardly from said vertical margin, said locking ribs being located on said second strip portion.

14. A plant guard according to claim 12 wherein said fastener strips are formed of extruded plastics material and are of identical configuration.

15. A plant guard according to claim 14 wherein the panel and said fastener strips are extruded integrally with one another.

16. A plant guard according to claim 12 wherein said panel is provided with outwardly projecting flap portions at the base thereof, each said flap portion being hingedly joined to said panel along a hinge line, said flap portions being arranged to provide a support base.

17. A plant guard according to claim 12 wherein said panel, when folded, is triangularly, square or rectangularly shaped.

18. A plant guard according to claim 12 wherein each said fastener strip is secured to the panel by heat welding, stitching or adhesive means.

19. A plant guard according to claim 12 wherein the edge margins of the panel have portions which converge towards the upper end of the panel (when the panel is unfolded).

20. A plant guard according to claim 12 further comprising a hinged flap hingedly joined to the upper edge of the panel along a hinge line, said flap, in use, being arranged to fold over and locate around a trellis wire whereby to support the guard in an upright condition.

21. A plant guard according to or claim 12 wherein each said fastener strip has a first strip portion secured to an inner surface portion of said panel adjacent a respective said vertical margin, and a second strip portion integral with said first strip portion which projects outwardly from said vertical margin, said locking ribs being located on said second strip portion.

22. A plant guard for protecting a small plant or sapling during its early growth period comprising:

a sheet-like panel of flexible material which is adapted to be folded into a tubular shape, and releasable fastening means for releasably fastening together adjacent vertical margins of said panel and comprising interlockable resilient flexible fastener strips respectively secured to and extending along said vertical margins, said fastener strips having locking profile ribs which interlock with one another so as to provide a reclosable fastener, each said fastener strip having a first strip portion secured to an inner surface portion of said panel adjacent a respective said vertical margin, and a second strip portion integral with said first strip portion which projects outwardly from said vertical margin, said locking ribs being located on said second strip portion.

23. A plant guard for protecting a small plant or sapling during its early growth period comprising:

a sheet-like panel of flexible material which is adapted to be folded into a tubular shape, and releasable fastening means for releasably fastening together adjacent vertical margins of said panel and comprising interlockable resilient flexible fastener strips respectively secured to and extending along said vertical margins, said fastener strips having locking profile ribs which interlock with one another so as to provide a reclosable essentially zip-type fastener, said fastener strips being formed of extruded plastics material and of identical configuration.

24. A plant guard for protecting a small plant or sapling during its early growth period comprising:

a sheet-like panel of flexible material which is adapted to be folded into a tubular, releasable fastening means for releasably fastening together said adjacent vertical margins of said panel and comprising interlockable resilient flexible fastener strips respectively secured to and extending along said vertical margins, said fastener strips having locking profile ribs which interlock with one another so as to provide a reclosable essentially zip-type fastener, and said panel being provided with outwardly projecting flap portions at the base thereof, each said flap portion being hingedly joined to said panel along a hinge line, said flap portions being arranged to provide a support base.

* * * * *